(12) United States Patent
Kang et al.

(10) Patent No.: US 12,300,026 B2
(45) Date of Patent: May 13, 2025

(54) METHOD AND APPARATUS FOR DEIDENTIFYING DRIVER IMAGE DATASET

(71) Applicant: Electronics and Telecommunications Research Institute, Daejeon (KR)

(72) Inventors: Jung-Gyu Kang, Daejeon (KR); Kyoung-Wook Min, Daejeon (KR); Jae-Hyuck Park, Daejeon (KR); Doo-Seop Choi, Daejeon (KR); Jeong-Dan Choi, Daejeon (KR)

(73) Assignee: Electronics and Telecommunciations Research Institute, Daejeon (KR)

( * ) Notice: Subject to any disclaimer, the term of this patent is extended or adjusted under 35 U.S.C. 154(b) by 487 days.

(21) Appl. No.: 17/575,317

(22) Filed: Jan. 13, 2022

(65) Prior Publication Data
US 2023/0058530 A1    Feb. 23, 2023

(30) Foreign Application Priority Data

Aug. 23, 2021    (KR) ........................ 10-2021-0111059

(51) Int. Cl.
| | |
|---|---|
| *G06V 40/16* | (2022.01) |
| *G06T 7/50* | (2017.01) |
| *G06T 7/70* | (2017.01) |
| *G06V 20/59* | (2022.01) |

(52) U.S. Cl.
CPC ............ *G06V 40/168* (2022.01); *G06T 7/50* (2017.01); *G06T 7/70* (2017.01); *G06V 20/597* (2022.01); *G06V 40/172* (2022.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,949,650 B2 | 3/2021 | Han et al. | |
| 2012/0131481 A1* | 5/2012 | Gupta | G06F 16/254 715/764 |
| 2013/0182007 A1* | 7/2013 | Syeda-Mahmood | G16H 30/40 345/629 |

(Continued)

FOREIGN PATENT DOCUMENTS

| | | |
|---|---|---|
| KR | 101861520 B1 | 5/2018 |
| KR | 20180060390 A | 6/2018 |

(Continued)

OTHER PUBLICATIONS

Orsten Hooge et al., Evaluating Automated Face Identity-Masking Methods with Human Perception and a Deep Convolutional Neural Network, ACM Transactions on Applied Perception, 2021, vol. 18, Issue 1, Article No. 3, pp. 1-20, doi.org/10.1145/3422988.*

(Continued)

*Primary Examiner* — Guillermo M Rivera-Martinez
(74) *Attorney, Agent, or Firm* — WILLIAM PARK & ASSOCIATES LTD.

(57) ABSTRACT

Disclosed herein is a method for deidentifying a driver image dataset. The method includes generating a combination dataset having a preset size based on a driver image dataset, extracting face shape information from each of pieces of driver image data forming the driver image dataset, and generating a deidentified dataset using the combination dataset and the face shape information.

12 Claims, 7 Drawing Sheets

(56) References Cited

U.S. PATENT DOCUMENTS

| | | | |
|---|---|---|---|
| 2014/0328547 A1* | 11/2014 | Whitehill | G06V 40/168 382/248 |
| 2019/0138749 A1* | 5/2019 | Kim | G06F 21/6254 |
| 2019/0303610 A1* | 10/2019 | Bodegas Martinez | G06F 16/152 |
| 2020/0042775 A1* | 2/2020 | Lim | G06F 18/217 |
| 2020/0097767 A1* | 3/2020 | Perry | G06V 40/165 |
| 2020/0151458 A1 | 5/2020 | Son et al. | |
| 2020/0151963 A1 | 5/2020 | Lee et al. | |
| 2020/0254974 A1* | 8/2020 | Gordon | B60R 25/25 |
| 2021/0019443 A1* | 1/2021 | Choi | G06V 10/82 |
| 2021/0192296 A1 | 6/2021 | Kim et al. | |

FOREIGN PATENT DOCUMENTS

| | | | |
|---|---|---|---|
| KR | 20200036656 A | | 4/2020 |
| KR | 102259457 B1 | * | 6/2021 |
| KR | 20210066390 A | * | 6/2021 |
| KR | 20210080919 A | | 7/2021 |
| KR | 20210085702 A | | 7/2021 |

OTHER PUBLICATIONS

Schnabel et al., Impact of Anonymization on Vehicle Detector Performance, 2019 Second International Conference on Artificial Intelligence for Industries (AI4I), pp. 30-34, doi: 10.1109/AI4I46381.2019.00016.*

Martin et al., Toward Privacy-Protecting Safety Systems for Naturalistic Driving Videos, IEEE Transactions on Intelligent Transportation Systems, vol. 15, No. 4, pp. 1811-1822, Aug. 2014, doi: 10.1109/TITS.2014.2308543.*

Martin et al., Balancing Privacy and Safety: Protecting Driver Identity in Naturalistic Driving Video Data, AutomotiveUI '14: Proceedings of the 6th International Conference on Automotive User Interfaces and Interactive Vehicular Applications, Sep. 2014, pp. 1-7, doi.org/10.1145/2667317.2667325.*

Fernandez et al., Driver Distraction Using Visual-Based Sensors and Algorithms, Sensors (Basel), Oct. 28, 2016; 16(11), pp. 1-44, 1805, doi: 10.3390/s16111805. PMID: 27801822; PMCID: PMC5134464.*

Orsten-Hooge et al., Evaluating the Effectiveness of Automated Identity Masking (AIM) Methods with Human Perception and a Deep Convolutional Neural Network (CNN), Feb. 2019, pp. 1-7, doi.org/10.48550/arXiv.1902.06967.*

Xiong et al., Privacy-Preserving Auto-Driving: A GAN-Based Approach to Protect Vehicular Camera Data, 2019 IEEE International Conference on Data Mining (ICDM), Beijing, China, 2019, pp. 668-677, doi: 10.1109/ICDM.2019.00077.*

Frick et al., "Achieving Facial De-Identification by Taking Advantage of the Latent Space of Generative Adversarial Networks", P314—INFORMATIK 2021—Computer Science & Sustainability, pp. 795-786, 2021, DOI: 10.18420/informatik2021-068.*

Hongyi Zhang et al., mixup: Beyond Empirical Risk Minimization, ICLR 2018, Machine Learning (cs.LG), Apr. 27, 2018.

Yuezun Li et al., De-Identification Without Losing Faces, IH&MMSec'19: Proceedings of the ACM Workshop on Information Hiding and Multimedia Security, Computer Vision and Pattern Recognition (cs.CV), Feb. 12, 2019.

* cited by examiner

METHOD AND APPARATUS FOR DEIDENTIFYING DRIVER IMAGE DATASET

CROSS REFERENCE TO RELATED APPLICATION

This application claims the benefit of Korean Patent Application No. 10-2021-0111059, filed Aug. 23, 2021, which is hereby incorporated by reference in its entirety into this application.

BACKGROUND OF THE INVENTION

1. Technical Field

The present invention relates generally to technology for deidentifying a driver state dataset.

More particularly, the present invention relates to data deidentification technology that can be simply implemented while maintaining the quality of a dataset using a MixUp augmentation method.

Also, the present invention relates to technology for augmenting a driver state dataset required for driver state recognition technology using an existing driver dataset.

2. Description of the Related Art

When autonomous driving is performed, a driver has to pay attention to the front of a vehicle while placing his/her hands on a steering wheel. In order to check in real time whether a driver keeps looking forwards, the development of driver state recognition technology for recognizing the state of a driver is actively underway.

In order to develop technology for accurately recognizing the state of a driver, a dataset configured with huge amounts of various driver state data is required.

However, when a machine-learning model is trained using data such as a driver state dataset, in which personal information is included, the personal information in the dataset has to be deidentified.

Particularly, faces of pedestrians and drivers are personal information, and it is essential to deidentify the same.

Here, when a deidentification process is performed for a huge dataset, manually designating a personal information area consumes considerable time and expenses. Accordingly, a method for automatically detecting a personal information area using a license-plate/face detector and then manually checking the same by human beings is generally being used. This method may somewhat reduce the time consumed for deidentification, but large amounts of time and effort are still consumed.

Also, in order to deidentify a personal information area, a method of hiding or blurring the corresponding area is commonly used. Also, a method of resynthesizing the corresponding area to have a new form using Generative Adversarial Network (GAN) technology has recently been attempted.

However, when a system is trained using data that includes information that is missing or distorted during a deidentification process, the performance thereof tends to be degraded, or the robustness thereof tends to decrease in an actual environment, and it is inevitable to permanently lose detailed information, such as facial expressions and eye gazes.

Therefore, what is urgently required is a data deidentification method capable of retaining detailed information, such as facial expressions, eye gazes, and the like, while protecting personal information of users.

Documents of Related Art (Patent Document 1) Korean Patent Application Publication No. 10-2021-0080919, titled "Method and apparatus for deidentification of data"

(Patent Document 2) Korean Patent Application Publication No. 10-2021-0066390, titled "Personal information deidentification method and system"

(Patent Document 3) Korean Patent Application Publication No. 10-2018-0060390, titled "Method for optimizing deidentified data according to purpose and apparatus using the method".

SUMMARY OF THE INVENTION

An object of the present invention is to provide a data deidentification method capable of retaining detailed information, such as facial expressions and the like, while protecting personal information of a user.

Another object of the present invention is to generate deidentified data that can be used for training by extracting face shape information from driver image data.

In order to accomplish the above objects, a method for deidentifying a driver image dataset according to an embodiment the present invention includes generating a combination dataset having a preset size based on a driver image dataset, extracting face shape information from each of pieces of driver image data forming the driver image dataset, and generating a deidentified dataset using the combination dataset and the face shape information.

Here, the combination dataset may include pieces of combination data, each of which is configured with a preset number of pieces of driver image data.

Here, generating the deidentified dataset may include generating a second true value corresponding to each of the pieces of combination data based on a first true value corresponding to each of the pieces of driver image data.

Here, generating the combination dataset may include sampling the preset number of pieces of driver image data in the driver image dataset, deleting the pieces of sampled driver image data from the driver image dataset, and resetting the driver image dataset when the number of pieces of driver image data in the driver image dataset is less than the preset number.

Here, sampling the preset number of pieces of driver image data may comprise performing sampling such that the frequency with which each of the pieces of driver image data is sampled falls within a preset range.

Here, the face shape information may include the position, the size, and the orientation of the face of a driver, and the positions of the facial features of the driver.

Here, generating the deidentified dataset may comprise performing correction such that driver images of the pieces of driver image data are located in the same area based on the face shape information.

Here, generating the deidentified dataset may comprise generating the deidentified dataset based on a MixUp method.

Also, in order to accomplish the above objects, an apparatus for deidentifying a driver image dataset according to an embodiment of the present invention includes one or more processors; and executable memory for storing at least one program executed by the one or more processors. The at least one program may generate a combination dataset having a preset size based on a driver image dataset, extract face shape information from each of pieces of driver image data forming the driver image dataset, and generate a deidentified dataset using the combination dataset and the face shape information.

Here, the combination dataset may include pieces of combination data, each of which is configured with a preset number of pieces of driver image data.

Here, the at least one program may generate a second true value corresponding to each of the pieces of combination data based on a first true value corresponding to each of the pieces of driver image data.

Here, the at least one program may sample the preset number of pieces of driver image data in the driver image dataset, delete the pieces of sampled driver image data from the driver image dataset, and reset the driver image dataset when the number of pieces of driver image data in the driver image dataset is less than the preset number.

Here, the at least one program may perform sampling such that the frequency with which each of the pieces of driver image data is sampled falls within a preset range.

Here, the face shape information may include the position, the size, and the orientation of the face of a driver, and the positions of the facial features of the driver.

Here, the at least one program may perform correction such that driver images of the pieces of driver image data are located in the same area based on the face shape information.

Here, the at least one program may generate the deidentified dataset based on a MixUp method.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
FIG. 1 is a view illustrating an example of a driver state dataset.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view illustrating an example of a driver state dataset.

Referring to FIG. 1, a driver state dataset includes 12 pieces of driver state data. Also, it can be seen that the orientation and position of a driver are slightly different in the respective pieces of driver state data.

When autonomous driving is performed, a driver has to keep looking forwards, and in order to determine whether the driver keeps looking forwards, training using a huge dataset of driver state data is essential.

Here, driver state data is data including personal information of a driver, and the process of deidentifying data is required in order to protect personal information.

Figure 2:
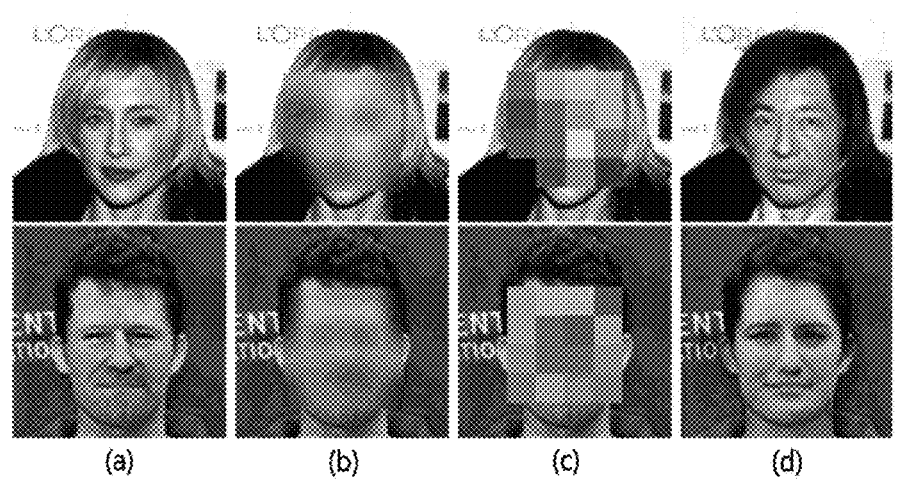
FIG. 2 is a view illustrating an example of an image deidentification method.

FIG. 2 is a view illustrating an example of an image deidentification method.

Referring to FIG. 2, various kinds of image deidentification methods are illustrated. FIG. 2(a) illustrates original data, and (b), (c), and (d) illustrate a blurred image, a pixelated image, and an image deidentified using AnonymousNet, respectively.

Here, it can be seen that, in the case of the blurred image and the pixelated image, information such as the facial expressions, the eye gaze, and the like of a person is lost in the deidentification process.

Also, some information of the original data may also be lost in the image deidentified using AnonymousNet, and deidentification using AnonymousNet has a disadvantage in that it is time-consuming.

Therefore, a simple and inexpensive deidentification method capable of retaining information such as the facial expressions, the eye gaze, and the like of a driver is required.

Accordingly, the present invention intends to provide a robust deidentification method capable of retaining detailed information, such the facial expressions, the eye gaze, and the like of a driver, using a MixUp method.

Figure 3:
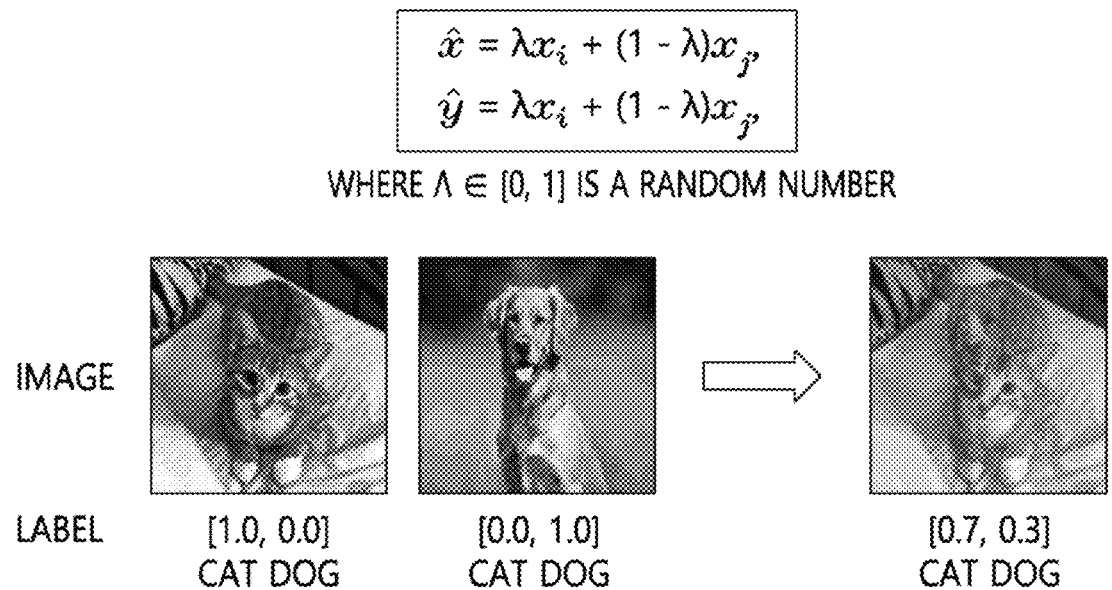
FIG. 3 is a view illustrating a MixUp method and an example of the use thereof.

FIG. 3 is a view illustrating a MixUp method and an example of the use thereof.

Referring to FIG. 3, it can be seen that data for training is newly generated by combining a cat image and a dog image with weights of 0.7 and 0.3.

That is, the MixUp method is a data augmentation method that is used in order to train a model well using insufficient training data, and is a method used for training by overlapping multiple images with the true value of a corresponding image.

The MixUp method is generally used in order to improve image classification performance, and may also be used for object detection. The MixUp method is often used because it can be simply implemented, has a fast computation speed, and generally helps performance improvement, without being affected by a model or a dataset.

Figure 4:
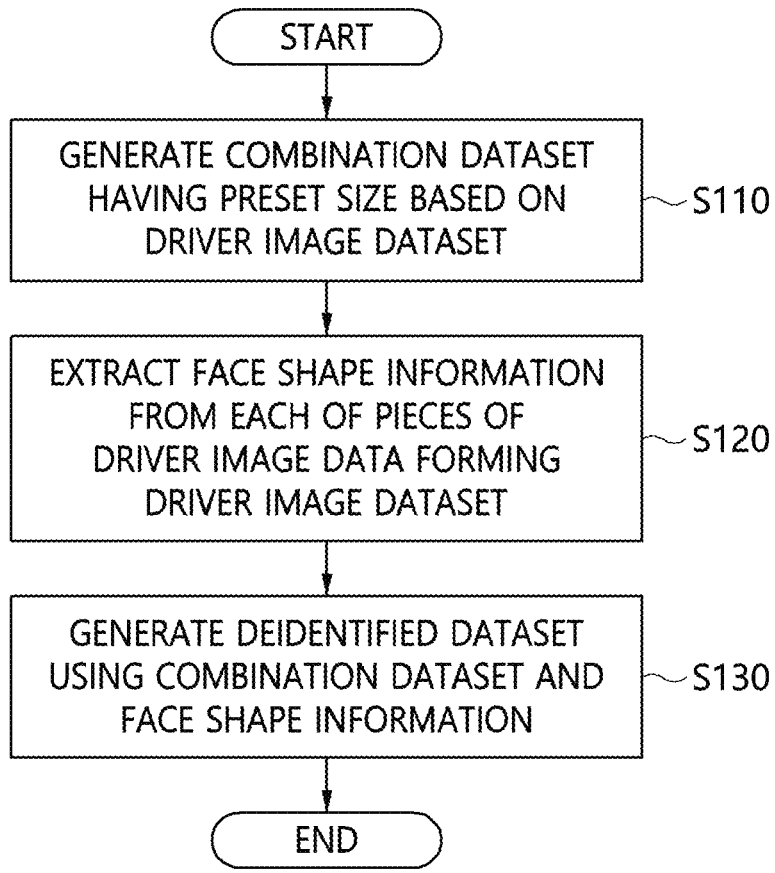
FIG. 4 is a flowchart illustrating a method for deidentifying a driver image dataset according to an embodiment of the present invention.

FIG. 4 is a flowchart illustrating a method for deidentifying a driver image dataset according to an embodiment of the present invention.

Referring to FIG. 4, in the method for deidentifying a driver image dataset, performed by an apparatus for deidentifying a driver image dataset, a combination dataset having a preset size is generated based on a driver image dataset at step S110.

Here, the combination dataset may include pieces of combination data, each of which is configured with a preset number of pieces of driver image data.

That is, the combination dataset includes k pieces of combination data, and each of the k pieces of combination data may be configured with n pieces of driver image data.

Specifically, the step of generating the combination dataset having the preset size (S110) may include sampling the preset number of pieces of driver image data in the driver image dataset, deleting the pieces of sampled driver image data from the driver image dataset, and resetting the driver image dataset when the number of pieces of driver image data remaining in the driver image dataset is less than the preset number.

That is, combination data is generated by sampling n pieces of data in the driver image dataset, which includes N pieces of data.

This process is repeated until the number of pieces of combination data, each of which is configured with n pieces of data, becomes k.

Here, the n pieces of sampled data are deleted from the driver image dataset, and when the number of pieces of data remaining in the driver image dataset after deletion becomes less than n, the driver image dataset is reset.

Here, sampling the preset number of pieces of driver image data may comprise performing sampling such that the frequency with which each of the pieces of driver image data is sampled falls within a preset range.

Hereinafter, the step of generating a combination dataset (S110) will be described in detail with reference to FIG. 5.

Figure 5:
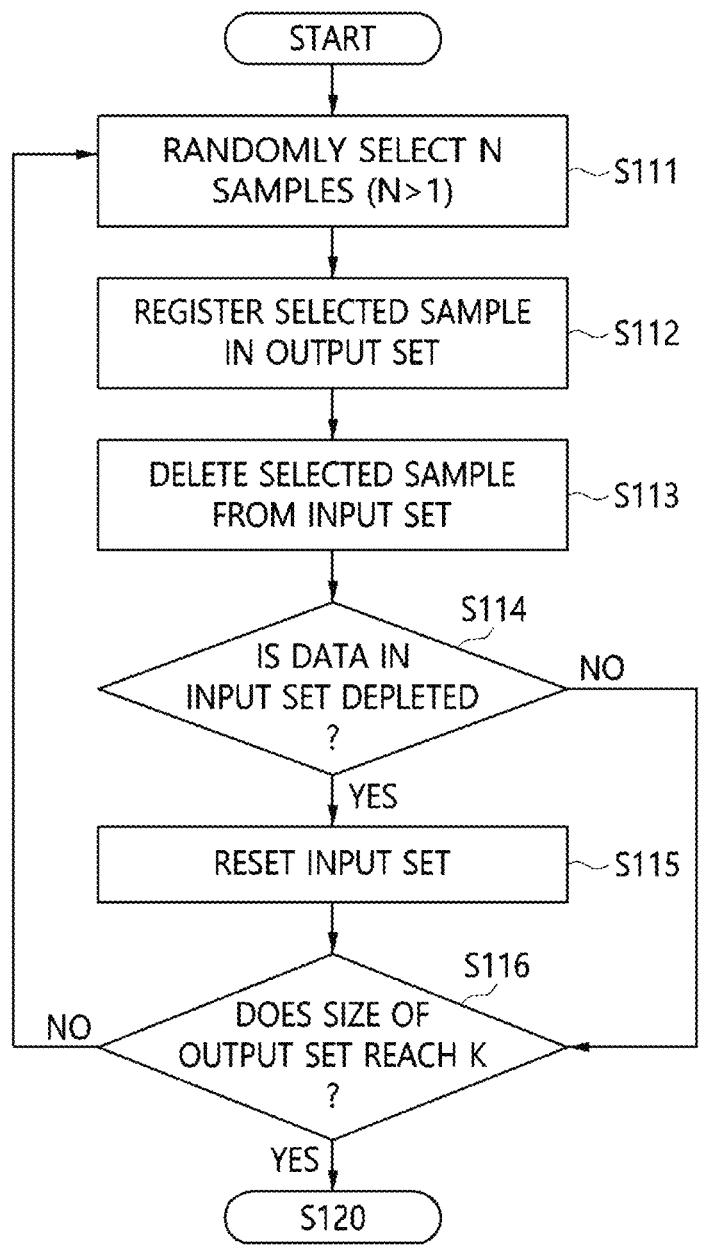
FIG. 5 is a flowchart illustrating in detail the step of generating a combination dataset.

FIG. 5 is a flowchart illustrating in detail the step of generating a combination dataset (S110).

Input for the step of generating the combination dataset is a dataset X including N pieces of data, and variables are k and n, which are the size of the combination dataset and the number of pieces of data forming each piece of combination data, respectively. That is, the number of pieces of data, n, indicates the number of pieces of data that are fused in a data fusion step to be described later.

Referring to FIG. 5, in the step of generating the combination dataset (S110), n samples are randomly selected at step S111.

Subsequently, the n selected samples are registered in an output set at step S112. That is, then samples form a single output.

Subsequently, the selected samples are deleted from the input set at step S113. By deleting the samples, the pieces of driver image data may be extracted with similar frequencies.

When data in the input set is depleted at step S114, the input set is reset at step S115, and whether the size of the output set reaches k is determined at step S116.

When data in the input set is not depleted at step S114, whether the size of the output set reaches k is determined at step S116.

When the size of the output set does not reach k at step S116, steps S111 to S115 are repeated until the size of the output set reaches k.

When the size of the output set reaches k at step S116, the combination dataset T is output, and the data selection process is terminated.

When the data selection process is terminated, the process of extracting face shape information from each of the pieces of driver image data forming the driver image dataset is performed at step S120 in the method for deidentifying a driver image dataset according to an embodiment of the present invention.

Here, in the step of extracting face shape information from each of the pieces of driver image data, a driver image dataset X, which includes N pieces of data, may be input.

Extracting the face shape information from each of the pieces of driver image data is aimed at generating an image that looks natural while making it impossible to identify personal information.

For the input driver state images, the face shape of a driver is predicted. Here, the face shape information may include the position, the size, and the orientation of a face, the positions of facial features, and the like. These predicted values are used when pieces of image data are actually fused.

Figure 6:
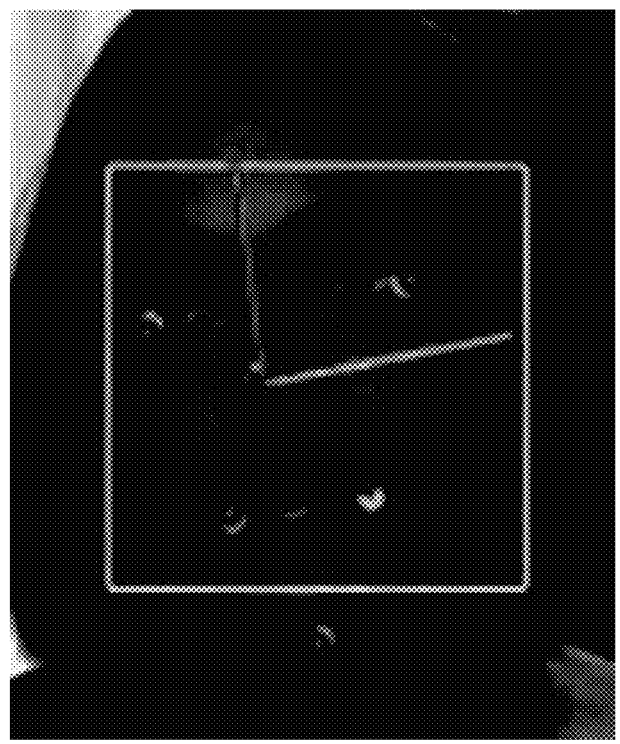
FIG. 6 is a view illustrating an example of a method for predicting the face shape of a driver.

FIG. 6 is a view illustrating an example of a method for predicting the face shape of a driver.

Referring to FIG. 6, it can be seen that an area including the eyes, nose, and mouth in a human face and information about the positions of the eyes, nose, and mouth are included in the face shape.

However, the method of predicting the face shape of a driver illustrated in FIG. 6 is an example, and the scope of the present invention is not limited thereto.

After the process of predicting the face shape information is performed at step S120, generating a deidentified dataset using the combination dataset and the face shape information is performed at step S130 in the method for deidentifying a driver image dataset according to an embodiment of the present invention.

Here, generating the deidentified dataset at step S130 may comprise generating the deidentified dataset based on a MixUp method.

Here, generating the deidentified dataset at step S130 may comprise performing correction such that the driver images of the pieces of driver image data are located in the same area using the face shape information acquired at the step of extracting the face shape information (S120).

Also, a true value corresponding to each of the pieces of combination data may be generated based on a true value corresponding to each of the pieces of driver image data.

Hereinafter, the step of generating a deidentified dataset (S130) will be described in detail with reference to FIG. 7.

Figure 7:
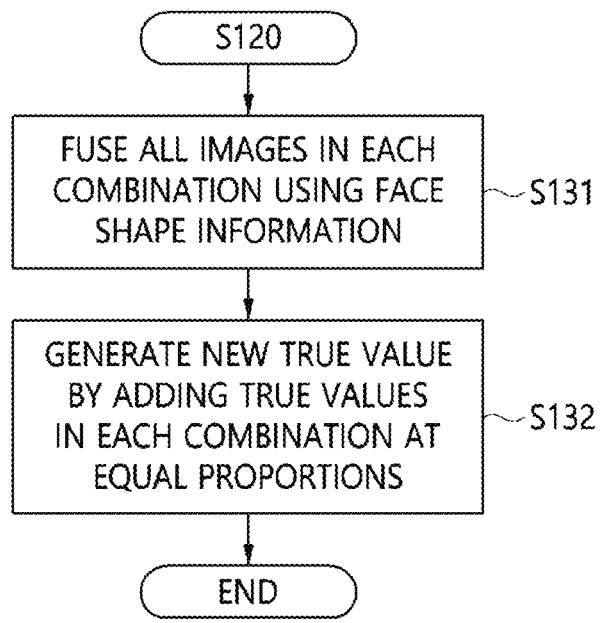
FIG. 7 is a flowchart illustrating in detail the step of generating a deidentified dataset.

FIG. 7 is a flowchart illustrating the step of generating a deidentified dataset (S130).

Referring to FIG. 7, in the step of generating the deidentified dataset (S130), all images in each piece of combination data are fused using face shape information at step S131.

Subsequently, true values in each piece of combination data are added at equal proportions, whereby a new true value is generated.

However, the proportions at which the true values in each piece of combination data are added are not limited to equal proportions, and may be selected differently.

Here, in the step of generating the deidentified dataset (S130), a combination dataset T, a dataset X including N pieces of data, face shape information corresponding to each image, and a true value Y corresponding to the dataset X may be received as input.

When the process of generating the deidentified dataset (S130) is performed using the input data, a deidentified dataset including k pieces of data may be generated.

Figure 8:
FIG. 8 is a view illustrating an example of a driver image dataset according to an embodiment of the present invention.
Figure 9:
FIG. 9 is a view illustrating an example of a deidentified dataset according to an embodiment of the present invention.

FIG. 8 and FIG. 9 illustrate examples of a driver image dataset and a deidentified dataset (N=4, k=4, n=2) in the method for deidentifying a driver image dataset according to an embodiment of the present invention.

FIG. 8 is a view illustrating an example of a driver image dataset according to an embodiment of the present invention.

Referring to FIG. 8, it can be seen that the driver image dataset includes four pieces of driver image data corresponding to different drivers (N=4).

However, this is an example, and the size of the driver image dataset may be set variously according to need.

FIG. 9 is a view illustrating an example of a deidentified dataset according to an embodiment of the present invention.

Referring to FIG. 9, each piece of deidentified data has a form in which two pieces of driver image data are combined (n=2).

Also, it can be seen that the deidentified dataset includes four pieces of deidentified data (k=4).

However, this is an example, and the size of the deidentified dataset may be set variously according to need.

Figure 10:
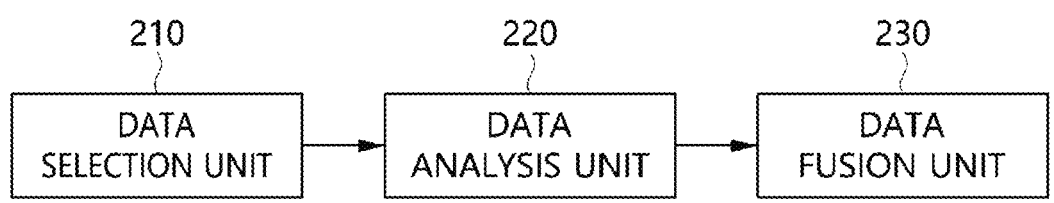
FIG. 10 is a block diagram illustrating an apparatus for deidentifying a driver image dataset according to an embodiment of the present invention.

FIG. 10 is a block diagram illustrating an apparatus for deidentifying a driver image dataset according to an embodiment of the present invention.

Referring to FIG. 10, the apparatus for deidentifying a driver image dataset according to an embodiment of the present invention includes a data selection unit 210, a data analysis unit 220, and a data fusion unit 230.

Here, the data selection unit 210 generates a combination dataset having a preset size based on a driver image dataset.

Here, the combination dataset may include pieces of combination data, each of which is configured with a preset number of pieces of driver image data.

That is, the combination dataset includes k pieces of combination data, and each of the pieces of combination data may be configured with n pieces of driver image data.

Specifically, the data selection unit 210 may sample the preset number of pieces of driver image data in the driver image dataset, delete the pieces of sampled driver image data from the driver image dataset, and reset the driver image dataset when the number of pieces of driver image data remaining in the driver image dataset is less than the preset number.

That is, combination data is generated by sampling n pieces of data in the driver image dataset, which includes N pieces of data.

This process is repeated until the number of pieces of combination data, each of which is configured with n pieces of data, becomes k.

Here, the n pieces of sampled data are deleted from the driver image dataset, and when the number of pieces of data remaining in the driver image dataset after deletion becomes less than n, the driver image dataset is reset.

Here, the data selection unit 210 may perform sampling such that the frequency with which each of the pieces of driver image data is sampled falls within a preset range.

Here, input of the data selection unit 210 is a dataset X configured with N pieces of data, and variables are k and n, which are the size of the combination dataset and the number of pieces of data forming each piece of combination data, respectively. That is, the number of pieces of data, n, indicates the number of pieces of data to be fused later in a data fusing step.

Here, the data selection unit 210 randomly selects n samples in order to generate a combination dataset.

Subsequently, the selected n samples are registered in an output set. That is, the n samples configure a single output.

Subsequently, the selected samples are deleted from the input set. By deleting the samples, the pieces of driver image data may be extracted with similar frequencies.

Here, when data in the input set is depleted, the data selection unit 210 resets the input set and determines whether the size of the output set reaches k.

Also, when data in the input set is not depleted, whether the size of the output set reaches k is determined.

When the size of the output set does not reach k, the processes from sampling of data in the input set to reset of the input set are repeated until the size of the output set reaches k.

When the size of the output set reaches k, the combination dataset T is output, and the data selection process is terminated.

Next, the data analysis unit 220 extracts face shape information from each of the pieces of driver image data forming the driver image dataset.

Here, the data analysis unit 220 may receive a driver image dataset X including N pieces of data.

Extracting the face shape information from each of the pieces of driver image data is aimed at generating an image that looks natural while making it impossible to identify personal information.

For the input driver state images, the face shape of a driver is predicted. Here, the face shape information may include the position, the size, and the orientation of a face, the positions of facial features, and the like. These predicted values are used when pieces of image data are actually fused.

Next, the data fusion unit 230 generates a deidentified dataset using the combination dataset and the face shape information.

Here, the data fusion unit 230 may generate the deidentified dataset based on a MixUp method.

Here, the data fusion unit 230 may perform correction such that the driver images of the pieces of driver image data are located in the same area using the face shape information acquired by the data analysis unit 220.

Also, a true value corresponding to each of the pieces of combination data may be generated based on a true value corresponding to each of the pieces of driver image data.

Specifically, the data fusion unit 230 fuses all images in each piece of combination data using the face shape information.

Subsequently, true values in each piece of combination data are added at equal proportions, whereby a new true value is generated.

However, the proportions at which the true values in each piece of combination data are added are not limited to equal proportions, and may be selected differently.

Here, the data fusion unit 230 may receive the combination dataset T, the dataset X including N pieces of data, face shape information corresponding to each image, and a true value Y corresponding to the dataset X as input.

Through a deidentified dataset generation process using the above input data, a deidentified dataset including k pieces of data may be generated.

Figure 11:
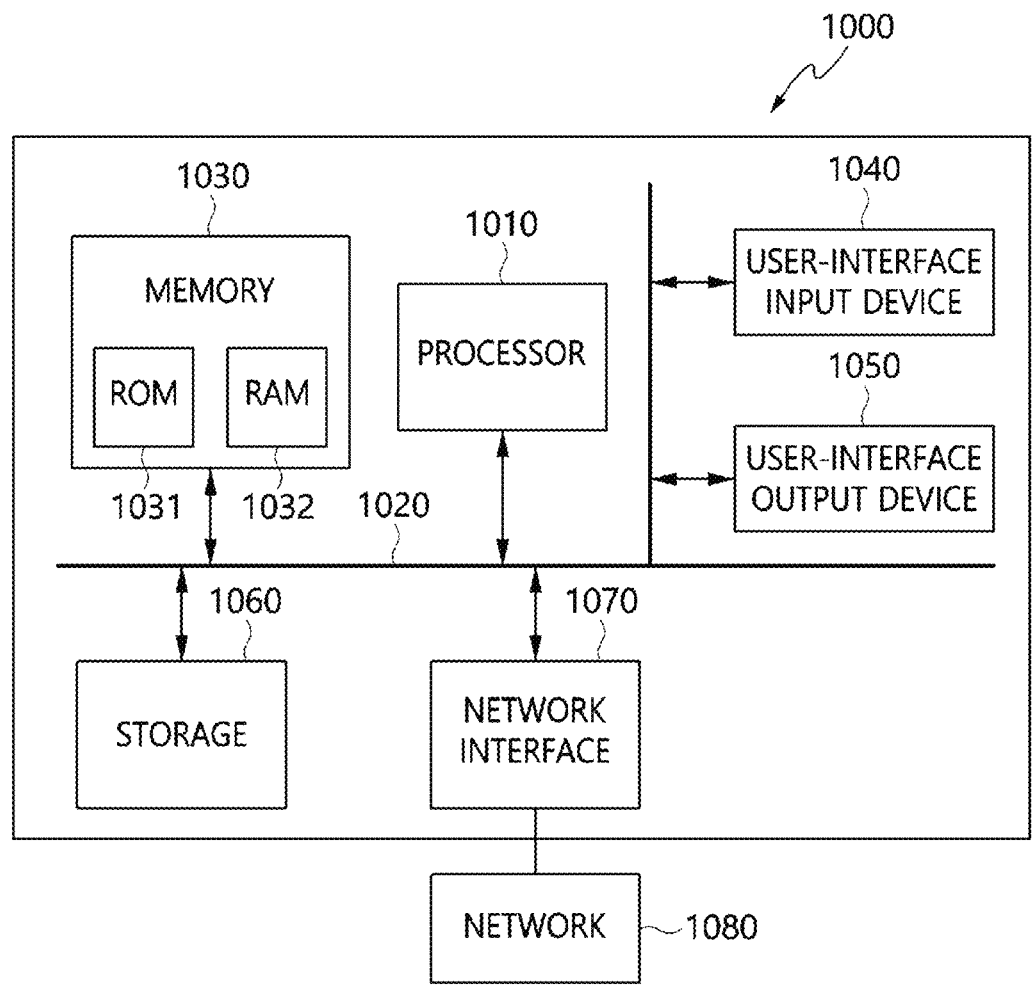
FIG. 11 is a view illustrating a computer system configuration according to an embodiment.

FIG. 11 is a view illustrating a computer system configuration according to an embodiment.

The apparatus for deidentifying a driver image dataset according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

At least one program executed by the processor 1010 may generate a combination dataset having a preset size based on a driver image dataset, extract face shape information from each of pieces of driver image data forming the driver image dataset, and generate a deidentified dataset using the combination dataset and the face shape information.

Here, the combination dataset may include pieces of combination data, each of which is configured with a preset number of pieces of driver image data.

Here, the at least one program may generate a second true value corresponding to each of the pieces of combination data based on a first true value corresponding to each of the pieces of driver image data.

Here, the at least one program may sample the preset number of pieces of driver image data in the driver image dataset, delete the pieces of sampled driver image data from the driver image dataset, and reset the driver image dataset when the number of pieces of driver image data in the driver image dataset is less than the preset number.

Here, the at least one program may perform sampling such that the frequency with which each of the pieces of driver image data is sampled falls within a preset range.

Here, the face shape information may include the position, the size, and the orientation of the face of a driver, and the positions of the facial features of the driver.

Here, the at least one program may perform correction such that the driver images of the pieces of driver image data are located in the same area based on the face shape information.

Here, the at least one program may generate the deidentified dataset based on a MixUp method.

According to the present invention, a data deidentification method capable of retaining detailed information, such as facial expressions and the like, while protecting personal information of a user may be provided.

Also, the present invention enables deidentified data capable of being used for training to be generated by extracting face shape information from driver image data.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for deidentifying a driver image dataset, comprising:
    generating a combination dataset including pieces of combination data, each of which is configured with a preset number of pieces of driver image data included in the driver image dataset;
    extracting face shape information from each of the preset number of pieces of driver image data included in the driver image dataset; and
    generating a deidentified dataset using the combination dataset and the face shape information,
    wherein the combination data is generated by sampling the preset number of pieces of driver image data included in the driver image dataset.

2. The method of claim 1, wherein generating the deidentified dataset includes
    generating a second true value corresponding to each of the pieces of combination data based on a first true value corresponding to each of the preset number of pieces of driver image data included in the driver image dataset.

3. The method of claim 1, wherein generating the combination dataset includes
    sampling the preset number of pieces of driver image data included in the driver image dataset;
    deleting the pieces of sampled driver image data from the driver image dataset; and resetting the driver image dataset when a number of pieces of driver image data in the driver image dataset is less than the preset number.

4. The method of claim 3, wherein sampling the preset number of pieces of driver image data included in the driver image dataset comprises performing sampling such that a frequency with which each of the pieces of driver image data is sampled falls within a preset range.

5. The method of claim 1, wherein the face shape information includes a position, a size, and an orientation of a face of a driver, and positions of facial features of the driver.

6. The method of claim 5, wherein generating the deidentified dataset comprises performing correction such that driver images of the pieces of driver image data are located in a same area based on the face shape information.

7. An apparatus for deidentifying a driver image dataset, comprising:
one or more processors that process at least one executable program code embodied in non-transitory computer readable storage media; and
executable memory for storing the at least one program executed by the one or more processors,
wherein the at least one program
generates a combination dataset including pieces of combination data, each of which is configured with a preset number of pieces of driver image data included in the driver image dataset,
extracting face shape information from each of the preset number of pieces of driver image data included in the driver image dataset; and
generating a deidentified dataset using the combination dataset and the face shape information,
wherein the combination data is generated by sampling the preset number of pieces of driver image data included in the driver image dataset.

8. The apparatus of claim 7, wherein the at least one program generates a second true value corresponding to each of the pieces of combination data based on a first true value corresponding to each of the preset number of pieces of driver image data included in the driver image dataset.

9. The apparatus of claim 7, wherein the at least one program
samples the preset number of pieces of driver image data included in the driver image dataset,
deletes the pieces of sampled driver image data from the driver image dataset, and
resets the driver image dataset when a number of pieces of driver image data in the driver image dataset is less than the preset number.

10. The apparatus of claim 9, wherein the at least one program performs sampling such that a frequency with which each of the pieces of driver image data is sampled falls within a preset range.

11. The apparatus of claim 7, wherein the face shape information includes a position, a size, and an orientation of a face of a driver, and positions of facial features of the driver.

12. The apparatus of claim 11, wherein the at least one program performs correction such that driver images of the pieces of driver image data are located in a same area based on the face shape information.

* * * * *